Dec. 30, 1958 H. J. RAVIS 2,866,541

PHONOGRAPH RECORD JACKET

Filed Sept. 12, 1956 3 Sheets-Sheet 1

INVENTOR
HERBERT J. RAVIS
BY
Irving Seidman
ATTORNEY

INVENTOR
HERBERT J. RAVIS
BY
Irving Seidman
ATTORNEY

Dec. 30, 1958 H. J. RAVIS 2,866,541

PHONOGRAPH RECORD JACKET

Filed Sept. 12, 1956 3 Sheets-Sheet 3

INVENTOR
Herbert J. Ravis
BY
Irving Seidman
ATTORNEY

United States Patent Office 2,866,541
Patented Dec. 30, 1958

2,866,541

PHONOGRAPH RECORD JACKET

Herbert J. Ravis, New York, N. Y., assignor to Peerless Album Co., Inc., Brooklyn, N. Y., a corporation Application September 12, 1956, Serial No. 609,474

1 Claim. (Cl. 206—62)

This invention relates to jackets or albums for phonograph records.

Broadly, it is an object of the invention to provide a substantially square jacket or envelope for a phonograph record which is substantially dust-proof and which permits the phonograph record to be easily withdrawn and inserted therein.

More particularly, it is an object of the invention to provide a drawer-like phonograph record jacket which safely houses and protects the phonograph record while permitting easy access to the phonograph record so that it can be safely withdrawn and inserted into the jacket.

It is well-known that it is very important to keep phonograph records free of dust since dust impairs the fidelity of the sound transcription and creates added friction and wear causing the record to deteriorate more rapidly than when the record is carefully housed in a jacket which prevents dust from entering the jacket. Since it is important to keep the phonograph records free of dust, various means have been used to house and store phonograph records dust-free, such as the placing of each phonograph record in a plastic envelope before housing it in a jacket with three sealed edges. This bulks the housing with consequent loss of storing space; adds to the cost of storing phonograph records and increases the time of handling such phonograph records by a user. In the jackets or housings herein provided the use of such plastic envelopes is eliminated since the phonograph records are stored flat in a substantially dust-free drawer-like housing.

By eliminating the use of plastic envelopes for phonograph records, the use of this jacket saves space, cost of the plastic envelopes and time in handling of the phonograph records when being used.

For a fuller understanding of the nature and objects of the invention reference is had to the following detailed description in connection with the accompanying drawings, in which.

Figures 1, 2, 4, 4A:
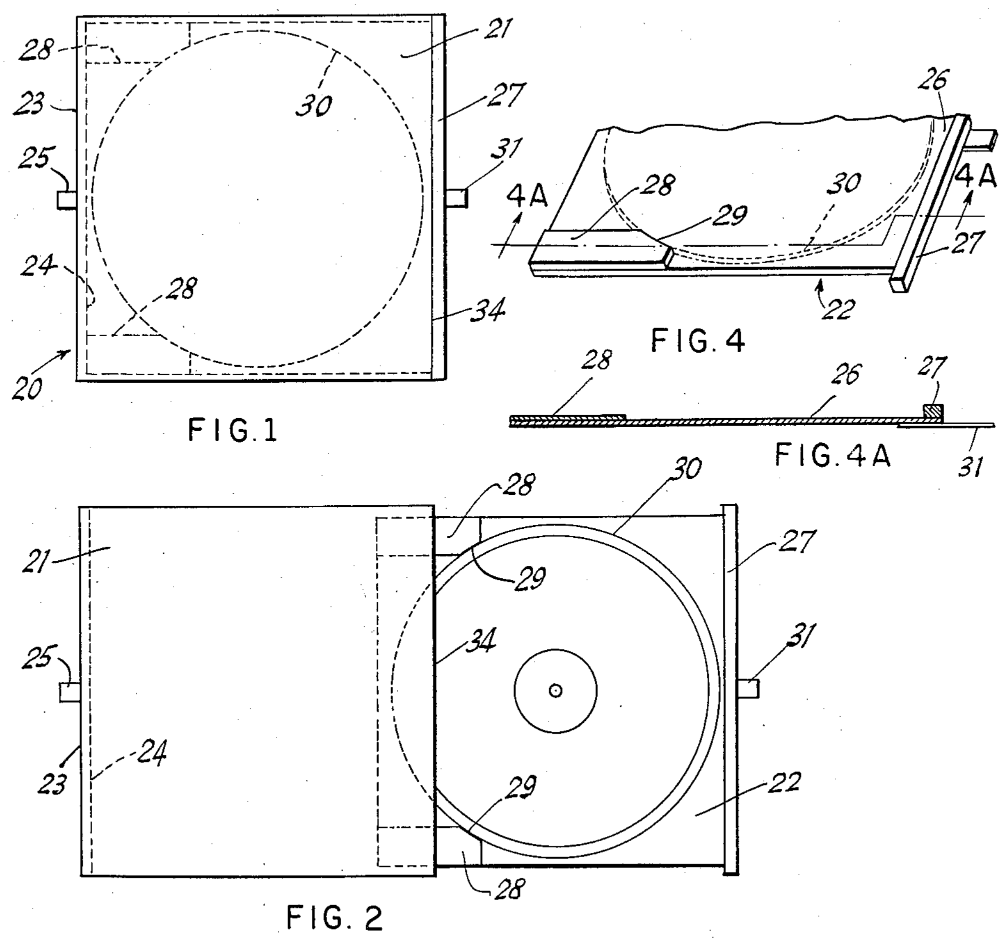
Fig. 1 is a plan view of the phonograph record jacket in closed position.
Fig. 2 is a plan view of the phonograph record jacket showing the drawer-like slide in extended position for easy removal of the phonograph record.
Fig. 4 is an edge view in perspective, of the drawer-like slide, partly broken away, showing the front stop member for the slide and the rear stops for the phonograph record.
Fig. 4A is a sectional view taken through line 4A—4A of Fig. 4.
Figure 3:
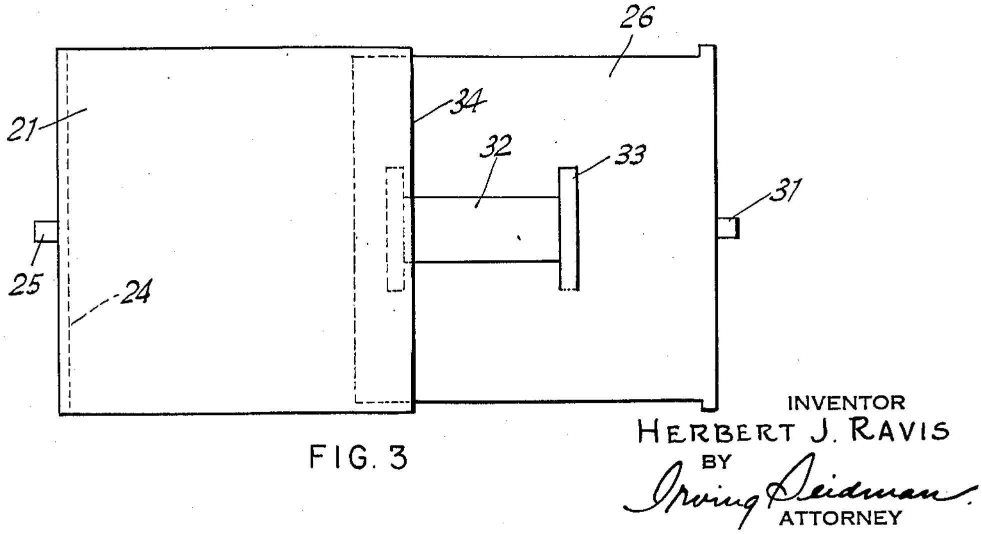
Fig. 3 is a rear or bottom view of the phonograph record jacket shown in Fig. 2 with the drawer-like slide in open position.

In the following specification and claim, the invention will be referred to as a jacket although the item may be called a housing, closure, envelope or album.

Referring to the drawings, specifically Figs. 1 to 4, inclusive, numeral 20 represents a phonograph record jacket comprising an outer thin envelope or housing 21 within which a drawer-like slide 22 is adapted to move. The envelope 21 is sealed on three sides, the fourth side being open to receive the drawer-like slide 22. The back end 23 of envelope 21 has an inserted back bone or spine 24 which is a narrow strip of cardboard pasted adjacent one inner edge of the cardboard of the jacket, preferably along the full height or width of the jacket to provide a flat leading edge and somewhat wider edge surface for the printing of the title of the record stored within the jacket. The spine 24 also provides greater rigidity to the back end of the jacket. The envelope 21 is very similar to envelopes now being used in the phonograph record field, except that it may be desirable in some instances, for the purposes hereinafter described, to provide the back end 23 with a small ribbon finger piece 25.

Primarily the invention resides in the drawer-like slide 22 in combination with envelope 21. The bottom or platform 26 of the slide 22 is preferably made of a substantially rigid cardboard with a slight degree of flexibility. Of course, bottom 26 may also be made of plastic or like material with the desired degree of rigidity and flexibility. At the front of platform 26 and extending transversely across the front edge is a stop and sealing member 27 which closes the opening of the envelope 21 when the drawer-like slide 22 is in closed position, as shown in Fig. 1. The stop and sealing member 27 may be of a piece of cardboard pasted or glued upon the leading edge of platform 26, or may be of plastic or metal to bend back upon itself. At the rear corners of platform 26 a pair of opposed stop members 28 are glued which are arcuately cut at 29 along the same arc as the outer circumference of phonograph record 30 and members 28 act as rear stops when the phonograph record 30 is placed upon platform 26. Since the stop and sealing member 27 rises above the upper surface of platform 26 the rear edge of member 27 also acts as a front stop for the phonograph record 30. A ribbon finger piece 31 may be attached at the center of the front of slide 22 so that the drawer-like slide may be more readily pulled out of the envelope 21. However, it is believed that the ribbon 31 as well as the ribbon 25 may be eliminated, if desired, since the fingers can readily grasp the sealing member 27 while the fingers of the other hand can easily hold the back end 23 and the same will not be compressed because of the back bone or spine 24 which lies transversely across the back thus, the phonograph record 30 will not be retarded in its travel out of the envelope 21.

In order to be sure that the slide 22 is not removed from the envelope 21 a ribbon or fabric strip 32 is pasted or attached to the back of the platform 26 at one end by any well known means such as a strip of adhesive tape 33 while the opposite end of the strip 32 is attached adjacent the inner portion of the leading edge 34 of envelope 21 so that the slide 22 can be pulled out of the envelope 21 only up to a predetermined point. This assures that the phonograph record 30 will not drop off the slide 22. Of course, the strip 32 may be attached to the slide and envelope by any other well-known means, such as pasting with an adhesive.

Figures 5, 6:
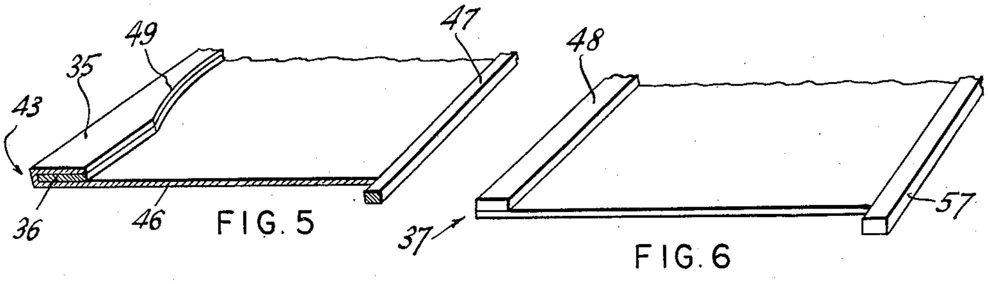
Fig. 5 is a view in perspective of a modified slide, partially broken away.
Fig. 6 is a view in perspective of another modified slide partially broken away.

In Figs. 5 to 10, inclusive, there is shown a number of modifications, all of which are stop means for seating or stopping the phonograph or positioning the phonograph record upon the platform 26. In Fig. 5 the cardboard of the platform 46 is scored at the back end 43 so that it may be turned back upon itself with the rear end 35 glued to an inserted spine or back bone 36 which in turn is glued to the platform 46 at the rear thereof. The central portion is arcuately cut as shown at 49 along the same arc as the outer circumferences of the phonograph record so that the phonograph record will be securely seated along this arcuately cut edge 49. The spine or back bone 36 is also arcuately cut to coincide with the arcuate edge 49, thus permitting the phonograph record 30 to seat itself against both the spine 36 and the rear end 35. The front of the slide shown in Fig. 5 has a stop and sealing member 47, the same as that shown in Fig. 2.

In Fig. 6, the slide is the same as that shown in Figs. 2 and 5, except that the back end 37 has a stop member 48 in the form of a transverse strip which may be of cardboard, metal, plastic or like material and which may be straight, as shown, or arcuately cut in a manner similar to that shown in Fig. 5. The front stop and sealing member 57 is the same as that shown in Figs. 2 and 5.

Figure 7:
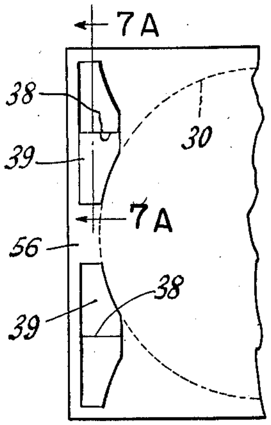
Fig. 7 is a plan view of still another modified slide partially broken away.
Figure 7A:
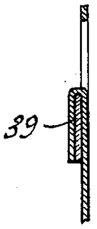
Fig. 7A is a sectional view taken through line 7A—7A of Fig. 7.

The modified slide shown in Fig. 7 is the same as Fig. 2 in its front portion including the front stop and sealing member (not shown) except that the rear end of the slide has cut-out portions scored along lines 38 so that the stop members 39 may be folded upwardly and glued to the upper surface of the platform 56 creating a pair of opposed stop members which are in the correct position to act as stops for the phonograph record 30. It will be noted that the stop members 39 are arcuately cut at the portion where the phonograph record will abut stop members 39 to create a better seat for the phonograph record.

Figure 8:
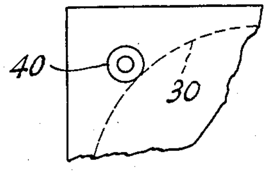
Fig. 8 is a plan view of still another modified slide partially broken away, showing the use of eyelets or grommets as stop members.
Figure 8A:
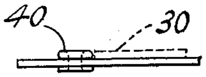
Fig. 8A is an edge view of the partial view shown in Fig. 8.

Figs. 8 and 8A show the back end only of a modified slide and show a pair of opposed eyelets or grommets 40 which are positioned adjacent the rear edge of the slide and act as stops for the edge of the phonograph record.

Figure 9:
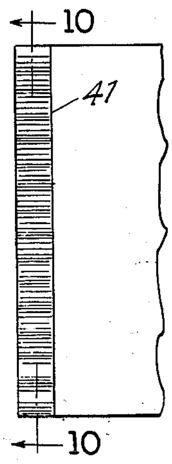
Figs. 9 and 10 are still other modified views of the stop means used on the rear end of the drawer-like slide.
Figure 10:
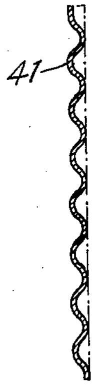
Figures 12, 13, 14, 15:
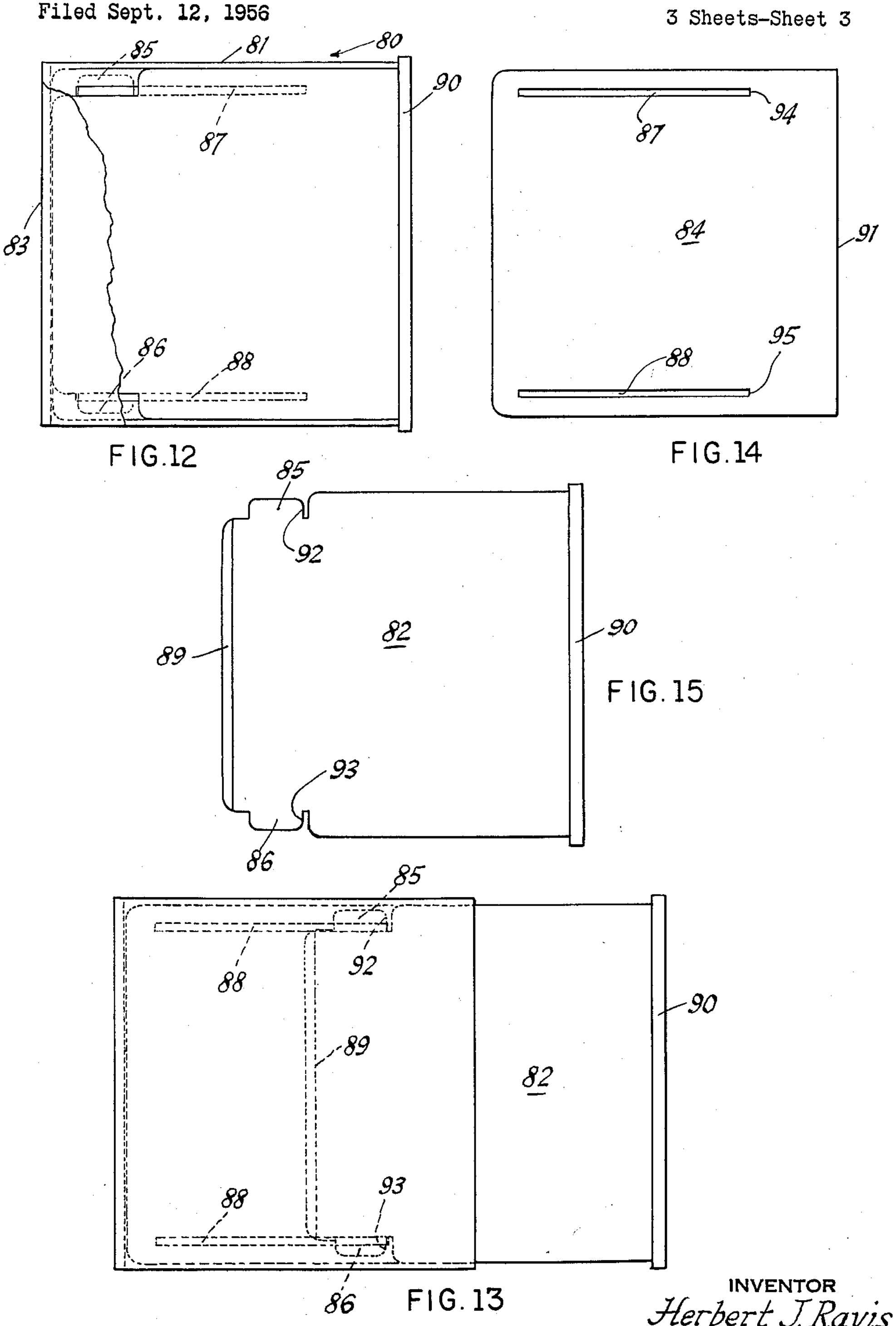
Fig. 12 is a plan view of still another modified jacket and slide in closed position.
Fig. 13 is a plan view of the jacket and slide shown in Fig. 12.
Fig. 14 is a plan view of one member of the slide used in Figs. 12 and 13.
Fig. 15 is a plan view of the second member of the slide which cooperates with the member shown in Fig. 14 used with the jacket of Figs. 12 and 13.

In Figs. 9 and 10 there is also shown only the back end of a modified slide; this back end being compressed towards the upper portion of the slide creating a serpentine corrugated ridge 41 which acts as a stop for the outer circumferential edge of a phonograph record. The corrugated ridge 41 extends only along the rear edge and transversley of the slide.

Figure 11:
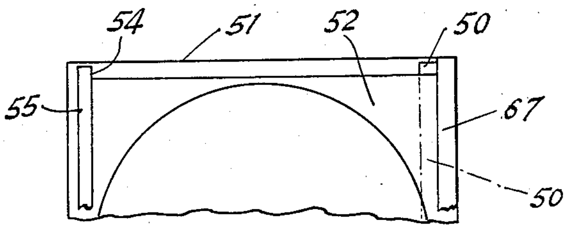
Fig. 11 is a plan view of still another modified drawer-like slide as used within the jacket or housing, partially broken away.

Fig. 11 shows another modified slide and envelope to house a phonograph record. The envelope 51 is the same in all respects as the envelope 21 except that adjacent the upper open edge there is a stop member 50 which is a cardboard strip glued to the inner upper edge. The slide 52 is the same in all respects as the slide 22 shown in Fig. 2 except that at its rear edge there is a stop and seating member 55 and the width of the slide is somewhat narrower. The stop and seating member 55 extends slightly beyond the opposed edges of the slide 52 and extends above the upper surface of the platform or slide 52 so that the inner edge 54 of member 55 stops against the front stop 50, thus preventing the slide 52 from leaving the envelope 51. The stop member 55 which extends above the level of the upper face of the slide 52 also acts as a stop and seat for the phonograph record when it lies upon the slide 52. The stop and sealing member 67, attached to the ront of the slide 52, acts in the same manner as heretofore described for the slide 22 and member 27. The slides of Figs. 5 and 6 may also be used in the same manner as described for Fig. 11.

Figures 11A, 11B:
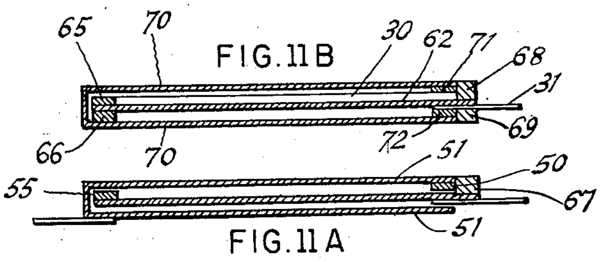
Fig. 11A is a cross-sectional view taken through a medial line from front to back of the jacket of Fig. 11.
Fig. 11B is a cross-sectional view taken through a medial line from front to back of a modified jacket.

In Fig. 11B, I have shown a cross section of still another modified slide which is used in a manner similar to the slide shown in Figs. 11 and 11A. This slide 62 has a pair of opposed cardboard strips 65, 66 glued transversely along the rear end on the upper and back surfaces of slide 62, and a pair of opposed cardboard strips 68, 69 glued transversely along the front end on the upper and back surfaces of slide 62. Along the inner upper and lower edges of the envelope 70 strips of cardboard 71, 72 are also glued transversely of the envelope. When the jacket is in closed position, as shown, front strips 68, 69 seal the front of the envelope 70 against dust. When the jacket is opened, the rear strips 65, 66 abut and stop at the front strips 71, 72 thus preventing the slide 62 from leaving the envelope 70. Strips 71, 72 may be made wider than shown to stop slide 62 sooner. The jackets of Figs. 11, 11A and 11B may have front and back opposed ribbon finger pieces, if desired.

Referring to Figs. 12 to 15, inclusive, numeral 80 represents still another modified jacket comprising an outer envelope or housing 81 within which a drawer-like slide 82 is adapted to move. Envelope 81 is sealed on three sides, the fourth or front side being open to receive the slide 82. The back or rear end 83 has a spine like 24 of Fig. 3. The inner back or bottom has a cardboard member 84 spot-glued thereto which coacts with the cardboard member shown in Fig. 15, as hereinafter described. Member 82 has a pair of opposite tabs 85, 86 which are inserted into channels or slits 87, 88 of member 84 and slide therein. A rear stop member 89 in the form of a cardboard strip is glued transversely along the rear upper edge and acts as a stop for the phonograph record. A stop and sealing member 90 is attached transversely along the upper face and front edge of slide 82 and acts as a stop against the open side of the envelope 81 and as a front stop for the phonograph record. When slide 82 is extended and to insure that it will not leave the envelope the channels 87, 88 extend only to a few inches from the front edge 91 of member 84 so that the front edges 92, 93 of tabs 85, 86 stop against the leading ends 94, 95 of channels 87, 88.

It will best be seen that the construction heretofore described permit a phonograph record to be rapidly and safely handled and housed within the envelope 21 in a dust-free manner since the sealing member 27 closes the opening of the envelope 21.

It is obvious that various changes and modifications may be made in the details of construction and arrangement of parts without departing from the general spirit of the invention.

I claim:

A substantially square jacket for a phonograph record comprising an envelope and a drawer-like slide, said envelope closed on three sides and open on the fourth side, said slide slidable within said envelope, stop and sealing means at the front of said slide for stopping the inward movement of said slide, for substantially sealing said envelope opening against dust and for acting as a stop for said phonograph record, cooperating stop means on said slide an envelope, a spine along the back of said envelope providing a flat leading edge for printing of the title of the phonograph record and for greater rigidity of said jacket, said stop means comprising a cardboard member attached to one side of said envelope, opposed channels of predetermined length in said cardboard member, a pair of opposite tabs at the rear of said slide, said tabs slidable in said channels and acting as stops against the forward ends of said channels to prevent said slide from leaving said envelope.

References Cited in the file of this patent

UNITED STATES PATENTS 2,083,868 Rottman ---------------- June 15, 1937
2,507,947 Williamson ------------- May 16, 1950

FOREIGN PATENTS 34,650 Austria ------------------ Oct. 10, 1908